United States Patent
Bonanno et al.

(10) Patent No.: US 11,181,204 B2
(45) Date of Patent: Nov. 23, 2021

(54) VALVE

(71) Applicant: CPT GROUP GmbH, Hannover (DE)

(72) Inventors: Rosario Bonanno, Bad Soden (DE);
Johannes Preuner, Weinheim (DE);
Alexander Vasilico, Weinheim (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/471,745

(22) PCT Filed: Dec. 13, 2017

(86) PCT No.: PCT/EP2017/082626
§ 371 (c)(1),
(2) Date: Jun. 20, 2019

(87) PCT Pub. No.: WO2018/114525
PCT Pub. Date: Jun. 28, 2018

(65) Prior Publication Data
US 2019/0331248 A1    Oct. 31, 2019

(30) Foreign Application Priority Data

Dec. 22, 2016 (DE) .................... 10 2016 226 095.2
Feb. 16, 2017 (DE) .................... 10 2017 202 511.5

(51) Int. Cl.
*F16K 25/00* (2006.01)
*F16K 31/06* (2006.01)
(Continued)

(52) U.S. Cl.
CPC .......... *F16K 31/0655* (2013.01); *F02B 37/16* (2013.01); *F16J 15/3204* (2013.01);
(Continued)

(58) Field of Classification Search
CPC .............. F16K 25/005; F16K 31/0655; F16K 31/0693; F16K 31/0686; F16K 39/024;
(Continued)

(56) References Cited

U.S. PATENT DOCUMENTS 4,156,439 A * 5/1979 Jeffries ............... F16K 11/0525
137/625.46
8,544,816 B2 * 10/2013 Bielass ................. F16K 39/022
251/50
(Continued)

FOREIGN PATENT DOCUMENTS

CN        105637193        6/2016
DE    10 2004 044 439     4/2006
(Continued)

OTHER PUBLICATIONS

Office dated Jun. 24, 2020 issued in Korean Patent Application No. 10-2019-7021368.
(Continued)

*Primary Examiner* — Matthew W Jellett
(74) *Attorney, Agent, or Firm* — Cozen O'Connor

(57) ABSTRACT

A valve includes a housing, a solenoid arranged in the housing, a pin movable by the solenoid, a pot-shaped piston connected to the pin, and a first seal arranged between the housing and the pot-shaped piston. The pot-shaped piston has, at least in the region of its open end, a radially peripheral second seal that bears against a second housing part when the valve is closed, the second housing part being connected to the housing.

12 Claims, 3 Drawing Sheets

(51) Int. Cl.

| | | |
|---|---|---|
| *F02B 37/16* | (2006.01) | |
| *F16K 39/02* | (2006.01) | |
| *F16J 15/3204* | (2016.01) | |
| *H01F 7/16* | (2006.01) | |
| *F02B 37/18* | (2006.01) | |

(52) U.S. Cl.
CPC ........ *F16K 25/005* (2013.01); *F16K 31/0686* (2013.01); *F16K 31/0693* (2013.01); *F16K 39/024* (2013.01); *F02B 37/18* (2013.01); *F02B 37/186* (2013.01); *H01F 7/1607* (2013.01)

(58) Field of Classification Search
CPC ....... F16J 15/3204; F02B 37/16; F02B 37/18; F02B 37/186; H01F 7/1607
USPC .................................. 251/282, 368; 277/353
See application file for complete search history.

(56) References Cited

U.S. PATENT DOCUMENTS

| 9,970,398 B2* | 5/2018 | Fujino | F02M 21/026 |
|---|---|---|---|
| 2007/0051105 A1* | 3/2007 | Thiery | F02B 39/00 |
| | | | 60/600 |
| 2009/0183510 A1 | 7/2009 | Bielass | |
| 2010/0206388 A1* | 8/2010 | Bielab | F16K 31/0644 |
| | | | 137/12 |
| 2013/0313455 A1* | 11/2013 | Bittner | F16K 31/0658 |
| | | | 251/129.15 |

FOREIGN PATENT DOCUMENTS

| DE | 10 2005 051 937 | 5/2007 |
|---|---|---|
| DE | 10 2007 002 432 | 6/2008 |
| DE | 10 2008 012 467 | 8/2009 |
| DE | 10 2008 031 738 | 1/2010 |
| DE | 10 2014 113 540 | 2/2016 |
| DE | 10 2014 113 550 | 3/2016 |
| JP | 2002 320688 | 11/2002 |
| WO | WO 2014/087478 | 6/2014 |
| WO | WO 2016/041659 | 3/2016 |
| WO | WO 2016/041951 | 3/2016 |
| WO | WO 2016/162968 | 10/2016 |
| WO | WO 2017/141606 | 8/2017 |

OTHER PUBLICATIONS

International Search Report issued in corresponding PCT Appln. No. PCT/E2017/082626.

Written Opinion issued in corresponding PCT Appln. No. PCT/E2017/082626.

German Office Action issued in corresponding German Appln. No. 10 2017 202 511.5.

\* cited by examiner

VALVE

CROSS REFERENCE TO RELATED APPLICATIONS

This is a U.S. national stage of International application No. PCT/EP2017/082626, filed on Dec. 13, 2017, which claims priority to German Application Nos. 10 2016 226 095.2, filed Dec. 22, 2016 and 10 2017 202 511.5 filed Feb. 16, 2017, the content of all of which are incorporated herein by reference.

BACKGROUND OF THE INVENTION

1. Field of the Invention

The invention relates to a valve having a housing, a solenoid arranged in the housing, a pin movable by the solenoid, and a pot-shaped piston connected to the pin, and a seal arranged between the housing and the piston.

2. Description of the Prior Art

Such valves are used, inter alia, as a diverter valve on the turbocharger in motor vehicles to open up a bypass to the suction side in overrun operation, and are thus known. In order to prevent excessive deceleration of the turbocharger, but also to ensure a fast launch, fast opening and closing of the valve is essential. In particular during the closing process, immediate closure as a result of the abutment of the piston against a valve seat is of importance. The valve seat is formed by the housing of the turbocharger, on which the valve is flange-mounted. In addition, the axially displaceable piston must be sealed against the housing. For this purpose, it is known to arrange a V-shaped seal in the housing, the limbs of which bear in each case against the housing and against the lateral surface of the pot-shaped piston. The sealing action is achieved by means of the preload of the two limbs. It is disadvantageous here that the sealing lip, bearing against the piston, of one limb is subjected to friction owing to the piston movement during the opening and closing, resulting in increased wear.

SUMMARY OF THE INVENTION

It is therefore an object of the invention to provide a valve with improved sealing function.

This object may be achieved, according to one aspect of the invention, if the piston has, at least in the region of its open end, a radially peripheral seal that bears against a second housing part when the valve is closed, the second housing part being connected to the housing.

With the arrangement of a radially peripheral seal at the open end of the piston, which interacts with the second housing part only in the closed state, it is achieved that sealing is limited to a period of time in which the piston is in the closed position, including a period of time immediately before the piston comes to rest. This means that the piston and seal make contact already shortly before the closed position. With the final movement of the piston into the closed position, the seal is deformed in such a way that it touches the second housing part and preloads the part in doing so. With the axially acting seal, the seal is thus prevented from being in contact with the second housing part, and being subject to associated friction, during the movement of the piston in the opening and closing processes. Friction-induced wear is thus prevented, and the service life of the seal is improved.

A particularly good sealing effect of an axially acting seal of this kind is achieved by virtue of the fact that the seal has at least one sealing lip, which is directed radially outward and toward the base of the pot-shaped piston and comes into contact with a sealing surface of the second housing part, wherein the sealing surface is arranged on a radially inward-facing collar.

Good resistance to media by the seal is ensured by the use of rubber, preferably a fluoro rubber, as a seal material. Another advantage is that a rubber seal of this kind is temperature-stable at up to 180° C.

In a simple aspect, the seal is arranged at the open end of the piston. The components of the valve, e.g., the solenoid, housing, spring and piston, must be configured to match the installation situation and operating conditions. As a result, the piston may have to have a certain height, which would entail a correspondingly large design of the seal. It has proven advantageous here not to arrange the seal exclusively at the open end but to arrange it in a region situated at the open end and which accounts for up to 30% of the piston height. This has the advantage that the seal can also be arranged below the open end on the lateral surface of the piston, allowing smaller dimensioning of the seal, particularly of the sealing lip.

Greater resistance to aggressive media and thus a longer service life are realized if the piston is composed of high-grade steel, preferably a chromium-nickel steel. A metal piston also has the advantage of higher temperature stability, such that the valve according to the invention can cover a wider field of application, in particular at relatively high temperatures.

Owing to the greater stability of metal in relation to plastic, the wall thickness of the piston can be made significantly smaller. Depending on the field of use, it has proven to be advantageous if the metal of the piston has a thickness of 0.3 mm to 1 mm, preferably of 0.4 mm to 0.8 mm and in particular of 0.5 mm.

According to another advantageous aspect, the piston can be produced at a particularly low cost in a single work step if the piston is a deep-drawn part.

The sealing of the bypass line of the turbocharger can be accomplished in a particularly simple manner if the piston has a further seal on the outside in the region of its base. According to one advantageous aspect, connection of the further seal to the piston is particularly simple if the base of the piston has at least 3, preferably 4 to 12 and in particular 5 to 8, apertures in the region of the annular seal, and if the seal extends as far as the inside of the base through the apertures.

According to one particularly advantageous aspect, the effort required for the arrangement of the two seals can be reduced if the seal and the further seal are connected integrally to one another in the region of the open end and in the base region, respectively. In this way, the two seals are connected to the piston in only a single work step. Additional installation of the seals can thus be eliminated. Moreover, the number of components and the complexity of a piston of this kind are reduced.

In the simplest case, the integral connection of the two seals can be accomplished by way of the outside of the cylindrical lateral surface of the piston. In this case, the piston is protected on the outside by the seal material. However, it is also conceivable to configure the connection between the two seals such that the seal material covers the inside of the cylindrical lateral surface of the piston.

In another aspect, the connection between the two seals is configured such that the seal material covers the cylindrical lateral surface both on the inside and on the outside. The piston is thus encased by the seal material and thus additionally protected in this region.

According to another aspect, reliable connection of the at least one seal in the region of the open end may be achieved by vulcanization onto the piston. It has furthermore proven advantageous if the second housing part is composed of metal, preferably of a high-grade steel, in particular of a chromium-nickel steel. This makes it possible to design the second housing part as a deep-drawn part and hence allows particularly low-cost production. In this way, the collar having the sealing surface for the seal arranged on the piston can also be manufactured in the same production process.

BRIEF DESCRIPTION OF THE DRAWINGS

The invention is described in more detail on the basis of an exemplary embodiment. In the figures.

DETAILED DESCRIPTION OF THE PRESENTLY PREFERRED EMBODIMENTS

Figure 1:
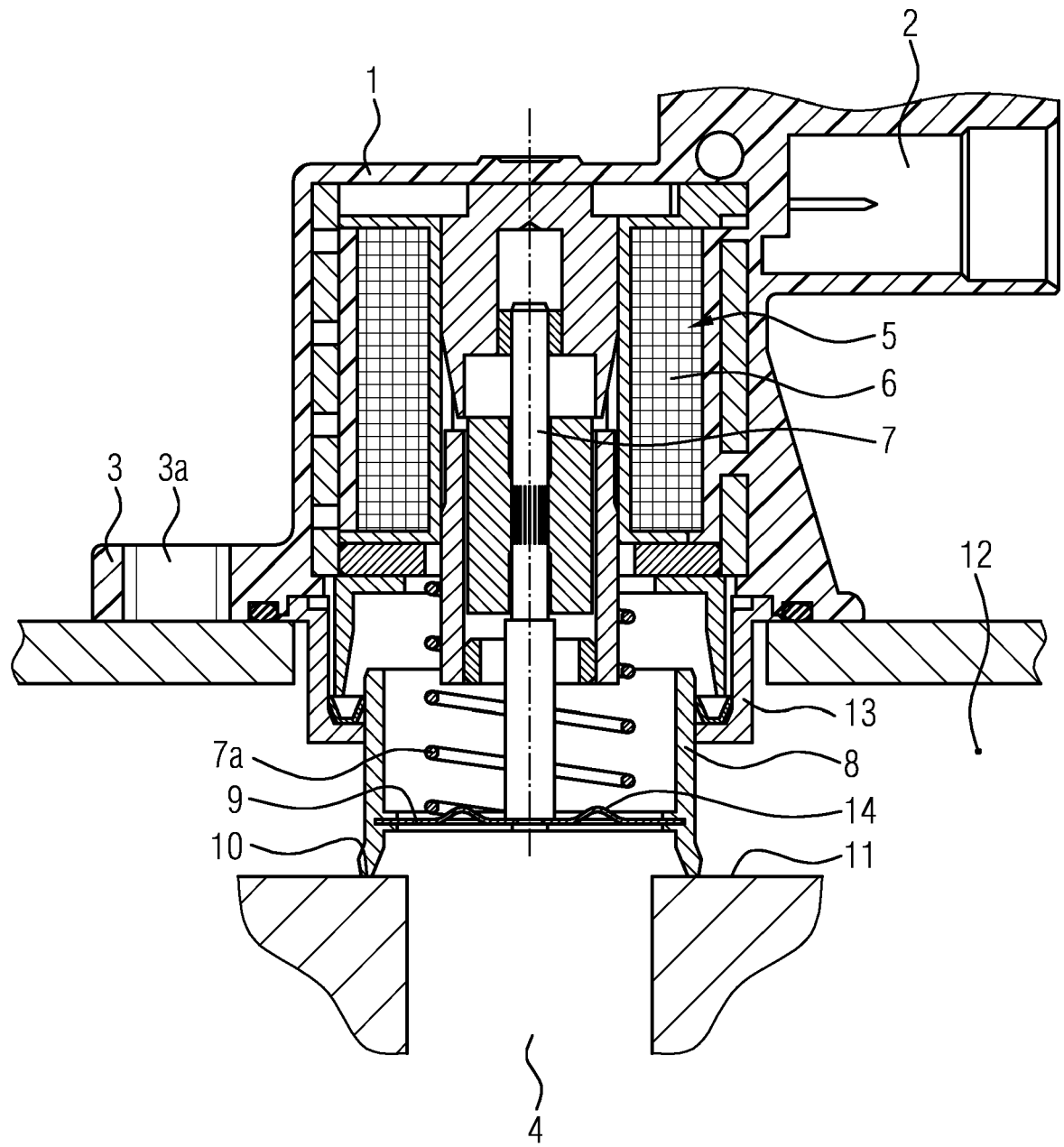
FIG. 1 shows a sectional illustration of a valve according to the prior art.

FIG. 1 shows the valve comprising a housing 1 with integrally formed socket 2 for the electrical connection of the valve. The housing 1 furthermore has an integrally formed flange 3 and three bores 3a, by which the housing 1 is flange-mounted on a turbocharger (not illustrated) in the region of the bypass line 4. In the installed position shown, the flange 3 is adjoined by a second housing part 13. In the housing 1, there is arranged a solenoid 5 with a coil 6 and a metal pin 7. The metal pin 7 is connected to a pot-shaped piston 8, which, at the circumference of its base 9, has an axially projecting annular sealing surface 10. In the closed position shown, the sealing surface 10 bears against the valve seat 11 in order to close off the bypass line 4, so that no medium can flow from the line 4 into the line 12. Here, a spring 7a pushes the piston 8 in the direction of the valve seat 11. The force generated by the spring 7a is counteracted by the force acting on the base 9 owing to the pressure in the line 12.

Figure 2:
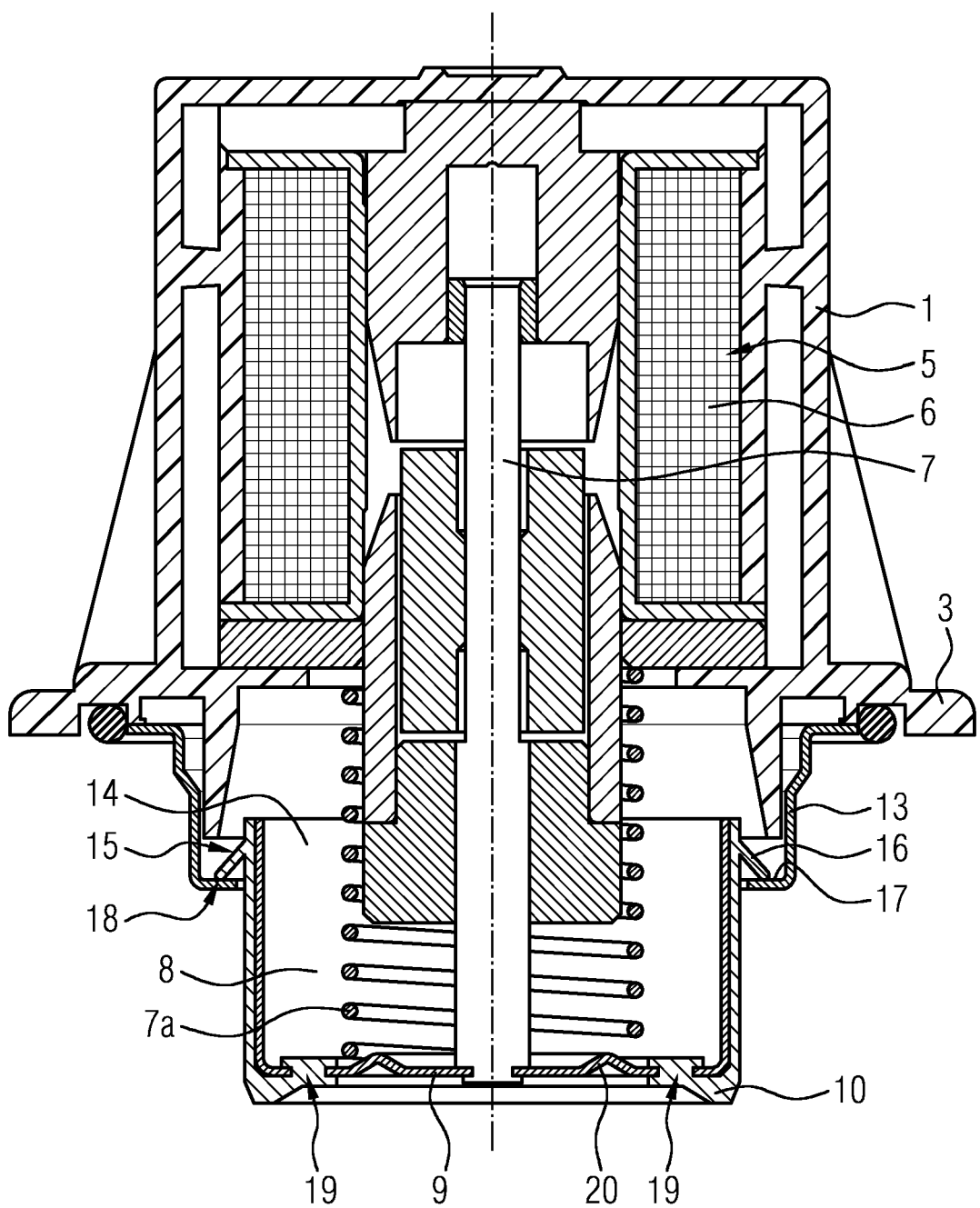
FIG. 2 shows a sectional illustration of a valve according to an aspect of the invention.

FIG. 2 shows the valve with a pot-shaped piston 8 composed of a chromium-nickel steel and having a wall thickness of 0.5 mm. A seal 15 composed of a fluoro rubber is arranged in the region 14 of the open end. The seal 15 has a sealing lip 16, which is directed radially outward and toward the base 9 of the pot-shaped piston 8 and comes into contact with a sealing surface 17 of the second housing part 13, wherein the sealing surface 17 is arranged on a radially inward-facing collar 18. Like the piston 8, the second housing part 13 is a deep-drawn part and is likewise composed of a chromium-nickel steel. The base 9 of the piston has eight apertures 19, through which the further seal 10 passes, with the result that the annular further seal 10 arranged on the outside of the base 9 extends as far as the inside of the base. Here, the apertures 19 form a kind of undercut for the further seal 10, ensuring that the seal is connected in a captive manner to the piston 8. At the same time, the further seal 10 is connected integrally to the seal 15 such that the outside of the cylindrical lateral surface of the piston is covered with a 0.5 mm-thick layer of fluoro rubber.

A bead 20 situated in the base 9 is used to guide and center the spring 7a. Openings (not shown) in the base 9 allow pressure equalization with the interior of the valve in order to enable easier opening.

Figure 3:
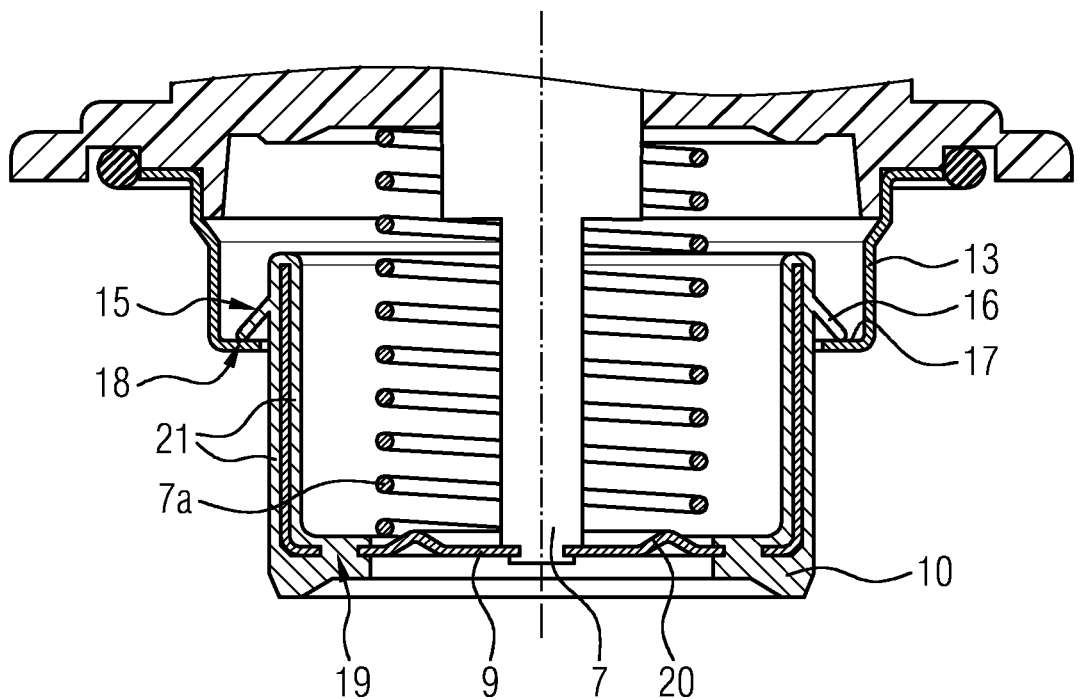
FIG. 3 shows a further embodiment as per FIG. 2.

In terms of the basic structure, the enlarged illustration of the valve according to the invention in the region of the piston in FIG. 3 corresponds to the valve in FIG. 2. The two seals 10, 15 are likewise connected integrally to one another, wherein the seal material 21 covers the cylindrical lateral surface of the piston 8 both on the inside and on the outside. The piston 8 is thus encased by the seal material 21 in this region.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
a housing (1);
a solenoid (5) arranged in the housing (1);
a pin (7) movable by the solenoid (5),
a pot-shaped piston (8) connected to the pin (7), the pot-shaped piston (8) having a base (9), a cylindrical lateral surface having a height, and an open end;
a first seal (10) arranged between the housing (1) and the pot-shaped piston (8),
wherein the pot-shaped piston (8) has, at least in a region (14) of its open end, a radially peripheral second seal (15) that bears against a second housing part (13) when the valve is closed, the second housing part (13) being connected to the housing (1),
wherein the second seal (15) and the first seal (10) are each made of a seal material (21) and are connected integrally to one another in the region (14) of the open end and in a region of the base (9), respectively, such that the seal material (21) completely covers the cylindrical lateral surface of the pot-shaped piston (8), over its entire height, both on the inside and on the outside of the cylindrical lateral surface.

2. The valve as claimed in claim 1, wherein the second seal (15) has at least one sealing lip (16), which is directed radially outward and toward the base (9) of the pot-shaped piston (8) and comes into contact with a sealing surface (17) of the second housing part (13), wherein the sealing surface (17) is arranged on a radially inward-facing collar (18).

3. The valve as claimed in claim 1, wherein the second seal (15) is made of a fluoro rubber.

4. The valve as claimed in claim 1, wherein the region (14) having the second seal (15) is configured so as to be up to 30% of the height of the cylindrical lateral surface.

5. The valve as claimed in in claim 1, wherein the pot-shaped piston (8) is made of a high-grade steel.

6. The valve as claimed in claim 5, wherein the pot-shaped piston (8) has a wall thickness of at least one selected from the group of: (a) 0.3 mm to 1 mm, (b) 0.4 mm to 0.8 mm and (c) 0.5 mm.

7. The valve as claimed in claim 5, wherein the pot-shaped piston (8) is a deep-drawn part.

8. The valve as claimed in claim 1, wherein the first seal (10) is arranged on the outside in a region of the base (9) of the pot-shaped piston (8).

9. The valve as claimed in claim 1, wherein the seal material (21) covers the cylindrical lateral surface of the pot-shaped piston (8) both on the inside and on the outside.

10. The valve as claimed in claim 1, wherein at least the second seal (15) is vulcanized in the region of the open end (14).

11. The valve as claimed in claim 1, wherein the second housing part (13) is made of a chromium-nickel steel.

12. The valve as claimed in in claim 5, wherein the high-grade steel comprises a chromium-nickel steel.

* * * * *